United States Patent [19]

Behnke et al.

[11] Patent Number: 5,056,213
[45] Date of Patent: Oct. 15, 1991

[54] METHOD OF ASSEMBLING A GEARMOTOR AND HOUSING

[75] Inventors: Edward Behnke, Taylors, S.C.; Joseph E. Dickey, Columbus, Ind.

[73] Assignee: Reliance Electric Industrial Company, Greenville, S.C.

[21] Appl. No.: 449,115

[22] Filed: Dec. 8, 1989

Related U.S. Application Data

[60] Continuation of Ser. No. 140,492, Dec. 28, 1987, abandoned, which is a division of Ser. No. 786,600, Oct. 11, 1985, Pat. No. 4,791,831.

[51] Int. Cl.⁵ ............................................. H02K 15/00
[52] U.S. Cl. .................................. 29/596; 74/421 A; 74/425; 74/606 R
[58] Field of Search ............... 29/596; 74/421 A, 425, 74/606

[56] References Cited

U.S. PATENT DOCUMENTS

| | | | |
|---|---|---|---|
| 2,037,890 | 4/1936 | Dow | 74/425 |
| 2,423,750 | 7/1947 | Benson | 29/596 |
| 2,600,697 | 6/1952 | Schmitter | 74/606 |
| 2,641,139 | 6/1953 | Beisner | 74/425 |
| 2,687,784 | 8/1954 | Klackner | 74/606 A |
| 2,734,393 | 2/1956 | Luenberger | 74/606 |
| 3,165,816 | 1/1965 | Thompson et al. | 29/596 |
| 3,303,366 | 2/1967 | Elson | 74/421 A |
| 3,388,459 | 6/1968 | Dochterman | 29/596 |
| 3,715,932 | 2/1973 | Sharp | 74/425 |
| 4,399,380 | 8/1983 | Hirano | 74/606 A |
| 4,486,176 | 12/1984 | Tardieu et al. | 74/416 |
| 4,576,058 | 3/1986 | Matumoto | 74/425 |
| 4,615,230 | 10/1986 | Guicharo | 74/421 A |

FOREIGN PATENT DOCUMENTS

| | | | |
|---|---|---|---|
| 695973 | 10/1964 | Canada | 74/425 |
| 2517018 | 11/1982 | France | 74/606 R |

OTHER PUBLICATIONS

G.E. Article re Versatility is a Choice of Motor Construction, The Versatile 19-Frame, Undated (3 pages).
Morat Company Publication for COMPACTA Brand Devices, Nov. 1982.

Primary Examiner—Irene Cuda
Attorney, Agent, or Firm—Dority & Manning

[57] ABSTRACT

A motor and associated gear system share an extended shaft axial with the motor. A rotor and a driving gear are attached to the shaft. Such an integral gearmotor concept minimizes coupling and sealing problems associated with prior art coupled motors and speed reducers. Particular housing features further enhance integrated advantages of the invention. Also, a reduction in the number of separate parts and use of a shim technique for establishing the stator/rotor air gap of the motor reduces prior art manufacturing costs associated with high precision borings while maintaining the accuracy of critical air gap characteristics. The shim feature of this invention is also equally and generally applicable to the establishment of air gaps in motors other than the present integral gearmotor.

16 Claims, 3 Drawing Sheets

METHOD OF ASSEMBLING A GEARMOTOR AND HOUSING

This is a continuation of application Ser. No. 07/140,492, filed Dec. 28, 1987, which was abandoned upon the filing hereof, which in turn was a divisional of Ser. No. 06/786,600, filed Oct. 11, 1985, now U.S. Pat. No. 4,791,831, issued Dec. 20, 1988.

BACKGROUND AND SUMMARY OF THE INVENTION

Motor and gear parts are combined with a common shaft, which may all be retained within a housing as an integral gearmotor. A method of manufacturing such a gearmotor and motors in general establishes a desired air gap between the rotor and stator of a motor.

In power drive applications, it is conventional for motive power devices, such as motors, and gear systems to be separately manufactured, paired in accordance with their characteristics and then installed. Such an approach requires that a separate motor and gear system be coupled together. In real world applications, any point of coupling always presents some problems. Such problems may take the form of a slight introduction of ineffeciency in operation such as a minor loss of transferred power, or, in a worst case, an absolute failure of the coupling such that no power is transferred.

The seriousness of minor power losses depends on the particular power drive application. However, some applications, such as conveyor belt drive systems associated with food preparation operations, are particularly critical with respect to certain other failure aspects of conventional motor/gear system couplings. For example, gears are often immersed in a lubricating oil. Coupling of such gears to a motor presents a potential oil leakage problem. Moreover, such leakage problems are aggravated by the fact that a coupling between a motor and its gear system is usually a high speed linkage. Leakage of such lubricating oil, even in small amounts, into a food preparation environment is not only highly undesirable, but might actually cause the manufacturer or food processor to stand in violation of applicable laws.

Aside from oil leakage problems, mechanical couplings between motors and gears are often difficult to decouple for required maintenance, such as repairing or replacing the motor or gears. Lengthy maintenance times generate high labor costs. High materials cost are caused as well if either a "healthy" motor or gear system is needlessly damaged while the other is receiving maintenance.

These and many other problems associated with conventional coupled gear and motor drives are addressed and solved by this invention. For example, the coupling problem is totally obviated by providing a gearmotor which includes a first shaft axial with the motor and extending outwardly therefrom; a rotor assembly, within the motor, disposed about and attached to the first shaft; a first gear secured to the extended portion of the first shaft; a plurality of bearing assemblies for rotatably supporting the first shaft at each of its ends and along its length between the motor and the first gear; an output shaft; and a second gear operatively associated with the first gear and output shaft so as to drive the output shaft. The resulting integral gearmotor with this extended shaft feature can thus have no oil leakage, vibration or misalignment problems at any mutual gear/motor coupling since no such conventional "coupling" exists.

Further disclosed as an aspect of this invention are certain housing features usable in combination with the present gearmotor. Improved manufacturing of such a gearmotor and motors in general is also achieved in accordance with additional features herein specifically disclosed below. For example, a shim technique may be practiced to accurately form a desired air gap between the stator and rotor of a motor. This shim method also insures a high degree of concentricity for the stator and rotor, which is well known to be an important aspect of establishing a high effeciency rating for a motor.

In summary, the shim method in accordance with one embodiment of this invention includes: resting a motor stator element on a support frame; rotatably fixing the motor rotor element to the frame and within the stator; placing shim means into an air gap formed between the stator and rotor so as to establish a desired and concentric air gap; securing the stator element to the support frame; and removing the shim means. The resulting motor has a predetermined air gap and desired concentricity without any need for or expense of carefully machined bores and bearings.

BRIEF DESCRIPTION OF THE DRAWINGS

These and numerous other features and advantages of the present method and apparatus may be better understood by studying the following detailed specification, in conjunction with the accompanying figures, in which.

Like reference characters used throughout indicate same or analagous elements.

DETAILED DESCRIPTION OF THE PREFERRED EMBODIMENT

Figure 1:
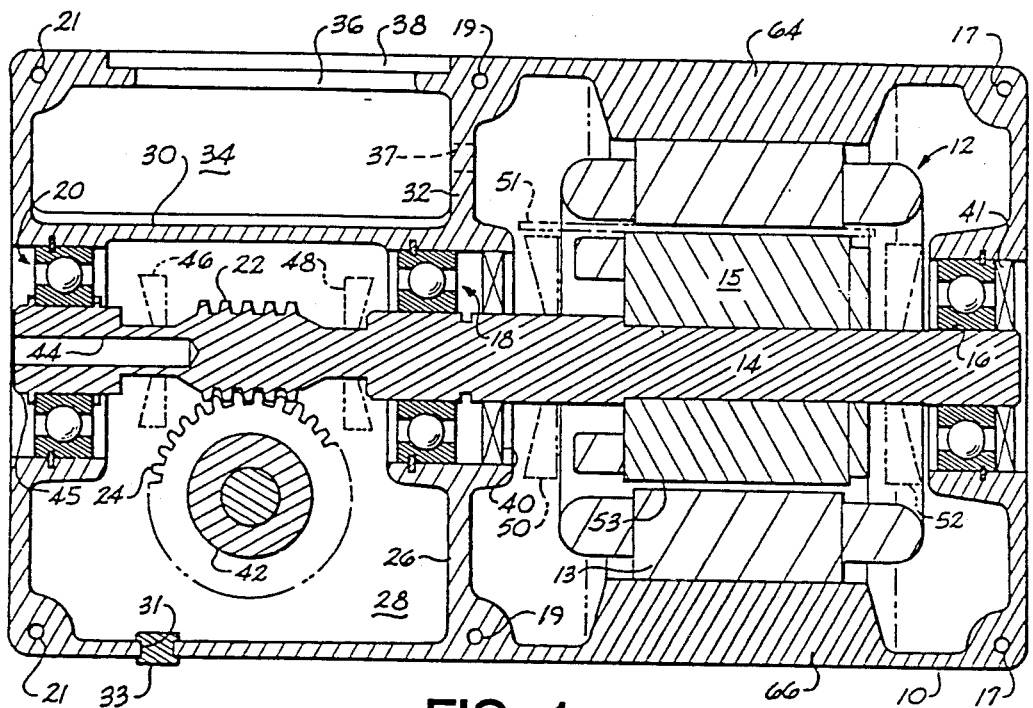
FIG. 1 is a vertical cross section along the major axis of an exemplary housing and gearmotor in accordance with this invention.

FIG. 1 illustrates a vertical cross section of an exemplary housing 10 and its relationship with a gearmotor in accordance with this invention. Motor 12 has a stator 13, rotor 15 and a shaft 14 co-axial with the center axis of the motor. The cross section bisects shaft 14. Rotor 15 may be shrunk onto, pressed onto or otherwise provided by an interference fit or other type of fit onto shaft 14. An interference fit is defined by the opening in pre-attached rotor 15 being smaller than the diameter of shaft 14. Shaft 14 extends generally along the longitudinal length of housing 10 and is supported by three bearing assemblies 16, 18 and 20. In essence, housing 10 functions as a support frame for the above-listed elements 12–20.

Each bearing assembly includes an inner and outer race with contained ball bearings, as is known and illustrated. The extended end portion of shaft 14 may have a gear 22 formed integrally therewith. Alternatively, gear 22 may be shrunk, pressed or the like onto shaft 14. Also, shaft 14 may be formed by the joining of any number of sectional pieces as desired to accomodate manufacturing expediences.

Figure 2:
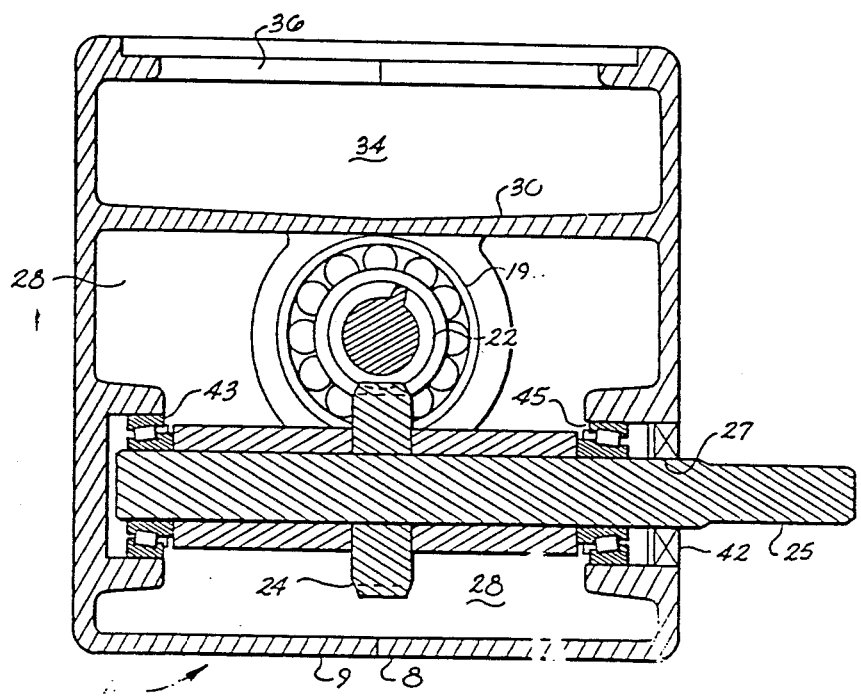
FIG. 2 is a vertical cross section along the minor axis of the present exemplary housing and gearmotor taken along line A-A' of FIG. 6.

Gear member 22 functions as a driving gear for a gear system. The gear system may take various forms, such as a worm gear system as illustrated in FIG. 1. Driving gear 22 turns with shaft 14 to turn driven gear 24. Driven gear 24 is received on an output shaft 25 as illustrated in FIG. 2, which in turn is rotatably supported by bearing assemblies 43 and 45. Output shaft 25 passes through an opening 27 in housing 10 to provide drive power for a desired drive application.

Whenever a worm gear drive is used, it is important that the rotational axis of worm gear 22 be precisely (or within very close tolerances) 90° from the rotational axis of worm wheel 24. This is accomplished in this exemplary embodiment by precise positioning of bearing assemblies 43 and 45 in housing 10.

Interior housing walls 26 and 30 cooperate with other walls of housing 10 is illustrated to define an interior chamber 28. Chamber 28 may hold oil for lubricating gears 22 and 24. Such oil may be virtually any suitable conventional lubricating oil. A high-grade synthetic motor oil with particular additives for a given application is one of the preferred. Oil may fill varying percentages of chamber 28. An 80% fill level enables housing 10 to be oriented in virtually any position and still have proper lubrication for the gears. Lesser fill levels are also effective, and it is not a requirement of this invention that any oil be enclosed in chamber 28. Opening 31 is a hole in one side of housing 10. It along with plug 33 may be used to help fill chamber 28 with oil. For example, if housing 10 were divided 50/50, and an 80% fill of chamber 28 were desired, then plug 33 could be removed to permit oil to pass through opening 31. Alternatively, both opening 31 and plug 33 could be omitted in a given embodiment.

Figure 5:
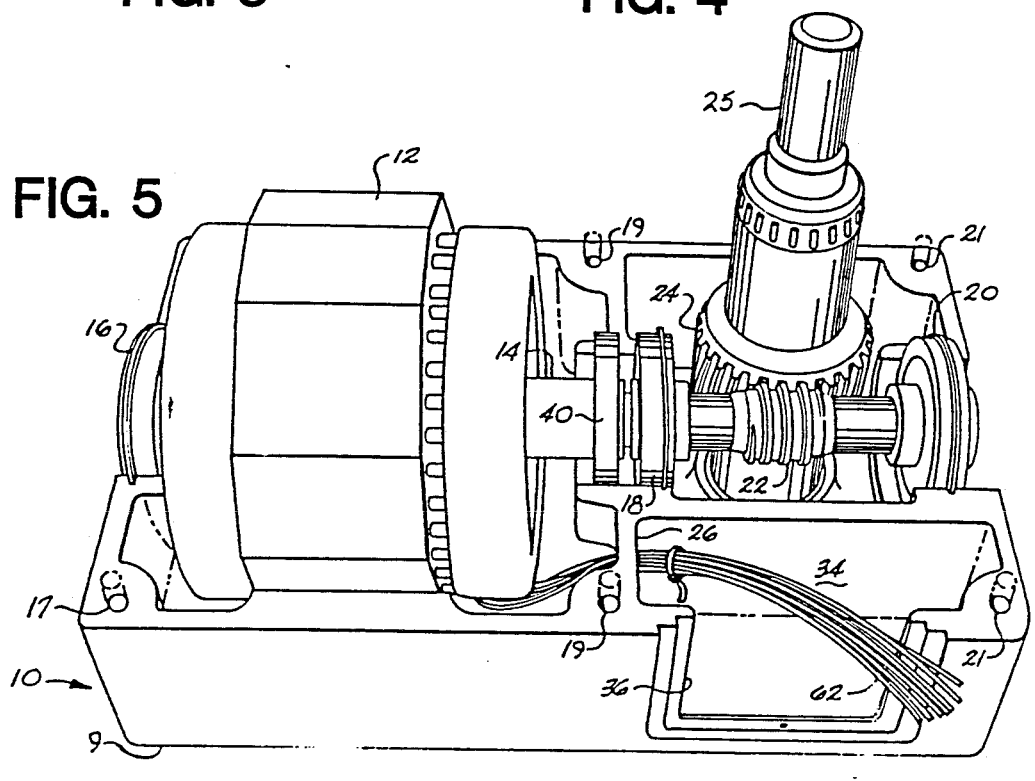
FIG. 5 is a perspective view of approximately one-half of an exemplary housing in accordance with this invention, with an exemplary gearmotor of this invention disposed therein.

Housing wall 30 also cooperates with an interior wall 32 and the perimeter of housing 10 to define a chamber 34 for receiving a power transmission means. Housing 10 defines an access opening 36 for chamber 34, and a cover plate 38 is associated therewith for receiving an input power transmission means 62 as illustrated in FIG. 5. Input power transmission means 62 also passes through an opening 37 shown in dotted lines in wall 32 and is operatively associated with motor 12. Chamber 34 further functions to isolate input power means 62 inserted therein from lubricating oil contained within chamber 28.

A sealing means 40 is received about shaft 14 adjacent bearing assembly 18 to prevent lubricating oil from escaping interior chamber 28 and reaching motor 12. A seal 41 is fitted around shaft 14 to prevent escape of any fluids from housing 10 or entry of any foreign matter thereinto. Seal 41 may be placed alternatively on either side of bearing assembly 16. The other end of shaft 14 does not require a sealing member because it rests in a blind cavity in housing 10, i.e., a partial opening in the housing which does not protrude entirely through the side walls thereof.

A seal 42 is also located around output shaft 25 of driven gear 24 to prevent escape of lubricating oil into associated operating environments. In prior art devices, the coupling between a motor and a speed reducer is generally a high speed coupling, while the output shaft of the speed reducer is a relatively low speed coupling. Prior art devices thus do not ordinarily suffer oil leakage problems at such relatively lower speed output couplings. Hence, seal 42 is sufficient to retain lubricating oil within interior chamber 28, while shaft 14 and seal 40 aid in eliminating lubricating oil sealing problems at the high speed "coupling." Such greatly reduces the leakage problems that accompany prior art structures.

Respective pairs of attachment means 17, 19 and 21 are used to attach two portions 8 and 9 of housing 10 together. These attachment means may comprise brads, rivets or the like if a relatively permanent sealing of housing 10 is desired, or may comprise screws, bolts or the like if a re-sealable housing is desired. Alternatively, such attachment means could be made of posts and mating receptacles for proper alignment, and the contiguous outer peripheries of the two portions of housing 10 could then be welded or otherwise joined together. FIG. 5 illustrates such upright posts embedded in portion 9 of housing 10; opposing receptacles therefore could constitute holes such as illustrated in FIG. 1 for receiving the posts of FIG. 5.

Housing 10 may be formed from any appropriate material such as cast iron, with lengthwise bores therethrough for insertion of the bearing assemblies 16 and 20. Such bores may be formed in alignment as illustrated to facilitate boring thereof in a single stroke. Alternatively, housing 10 may be formed from molded plastics having embedded particulate metal matter or embedded metal plates to provide sufficient overall thermal conductivity ratings for proper heat dissipation. Use of other alternative materials having sufficient heat dissipation is also possible.

In general, heat is generated within housing 10 at all three bearing assemblies 16, 18 and 20, by operation of motor 12, and by interaction of gears 22 and 24. A variety of heat dissipation features may be used in accordance with the present invention. For example, a portion of shaft 14 may be hollow at 44, beginning with the portion thereof at gear 22 and extending to end 45 thereof adjacent bearing 20. Hollow shaft portion 44 thus defines a heat pipe to dissipate heat generated by dynamic actions of gears 22 and 24. Also, or in the alternative, fan blades (fins) may be provided at any or all of the locations interior to the housing as variously shown in phantom lines at 46, 48, 50 and 52 along the length of shaft 14. Any of these fans interior to housing 10 would be rotated by shaft 14 and thus dissipate heat.

Figure 3:
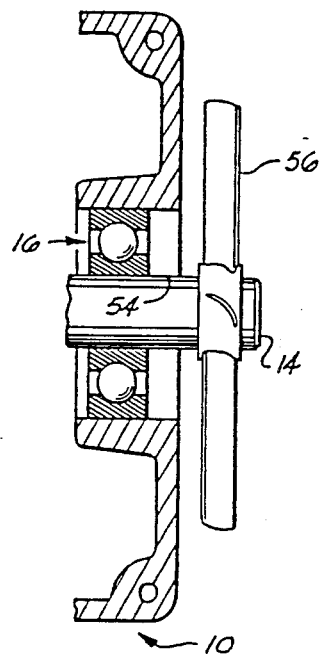
FIGS. 3 and 4 are examples of cooling fan feature modifications of this invention.
Figure 4:
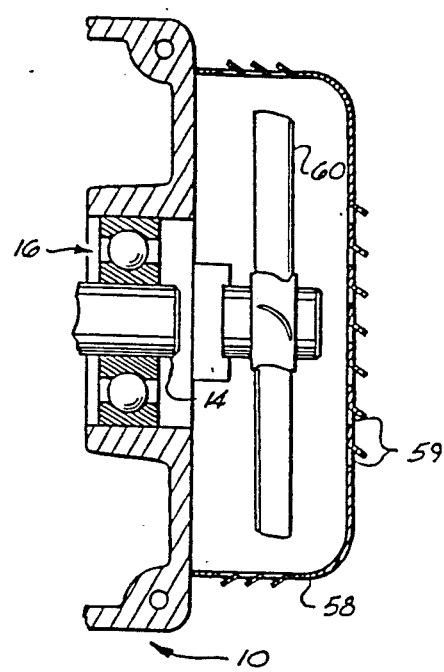

FIGS. 3 and 4 also illustrate alternative heat dissipation features of this invention, which generally include cooling fins exterior to housing 10. FIG. 3 illustrates an opening 54 defined by housing 10 adjacent motor 12 through which shaft 14 extends. A fan blade arrangement 56 may then be associated with this extension of shaft 14 to draw air along and over the outer periphery of housing 10 and thereby dissipate heat.

Alternatively, as illustrated in FIG. 4, shaft 14 may terminate within housing 10 as it does in FIG. 1, and a shroud 58 may be attached externally to housing 10. Shroud 58 may include a separately powered cooling fan 60 to perform the same cooling function as that of cooling fan 56 of FIG. 3. Further as an alternative, a similar shroud 58 could also be used to enclose cooling fan 56 of FIG. 3. Openings 59 are formed in shroud 58 to permit a necessary flow of air to cool housing 10.

Figure 6:
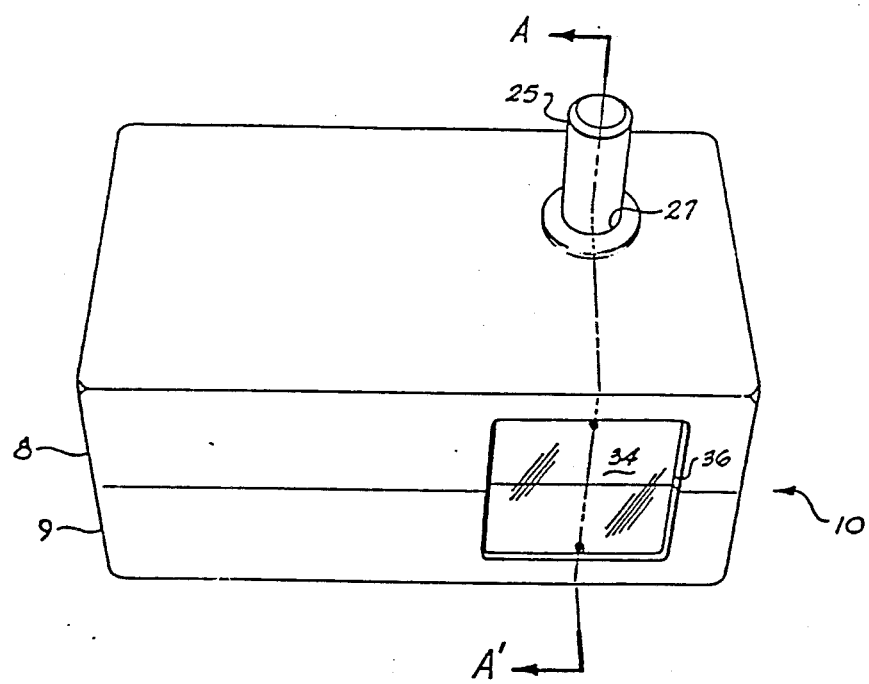
FIG. 6 is a perspective view of a housing of the present invention illustrating the minimum one drive output and one input power portal required by this invention.

FIG. 2 illustrates a vertical cross-section of FIG. 6 taken along the line A-A' thereof. Driven gear 24 and its output shaft 25 are bisected by this cross-section. FIG. 2 is essentially self-explanatory, but is particularly provided to illustrate interior chamber 28 which encloses lubricating oil (not illustrated) for gears 22, 24. Interior wall 30 separates interior lubricating oil chamber 28 from chamber 34. Actual insertion of an input power transmission means 62 into chamber 34 is illustrated in FIGS. 5 and 6.

Referring now to FIG. 5, a perspective side view of approximately a one-half portion 9 of a housing 10 in accordance with the present invention, with an integral gearmotor disposed therein, is illustrated. FIG. 5 illustrates clearly the cooperation and interaction of motor 12, shaft 14 (including driving gear 22) and driven gear 24 (including its output shaft 25) with housing 10. An input power transmission means (here a bundle of electrical power and control wires) 62, eg., to provide power to and control of motor 12, is inserted through opening 36 of chamber 34, and is electrically connected to motor 12. Cover plate 38 is removed in this figure for purposes of illustrating input power means 62 within chamber 34. Bearing assemblies 16, 18 and 20 are illustrated as well as sealing means 40. Pairs of attachment elements 17, 19 and 21 constituting posts in housing 10 are illustrated respectively in the housing periphery opposite each of bearing assemblies 16, 18 and 20, and may be used generally as discussed in conjunction with elements 17, 19 and 21 of FIG. 1.

A further housing portion 8 would be disposed symmetrically about motor 12, shaft 14 and gear 24, with output shaft 25 of gear 24 emerging through opening 27 as described above.

FIG. 6 illustrates such a completed housing 10 with portions 8 and 9 joined. Power input means 62 may be inserted through opening 36 into chamber 34, and output shaft 25 of gear 24 may emerge from an opening 27 in housing 10. Otherwise, in the embodiment of FIG. 6, there need be no openings in housing 10. Hence, a completely self-contained integral gearmotor results with housing 10 completely surrounding the same, with the exception of output shaft 25. A "motor" and "speed reducer" combination may be selected to establish a given integral gearmotor with a range of speed reducing ratios, preferably within the range of 5:1 to 60:1.

As discussed above, lubricating oil for the gear drive assembly is retained within interior chamber 28. However, as understood from the overall perspective view of FIG. 6, and for an embodiment of this invention with the periphery of housing 10 sealed as well as joined, even if minor amounts of lubricating oil were to escape from interior chamber 28, all such amounts would still be generally contained within housing 10. As a result, and as earlier stated, housing 10 may be positioned virtually in any desired orientation with respect to gravity due to the plurality of oil sealing features of this invention.

Coupling of output shaft 25 to the drive input of a particular drive application may be accomplished merely with a set screw or key-type coupling. Such couplings present no special problems with regard to their maintenance (i.e., de-coupling) in direct contrast with prior art couplings between motors and speed reducers. If desired, the entire housing 10 may be replaced as an integral unit with respect to a particular drive application should any maintenance be required. The power input means 62 would be disconnected from a power source as for any previous prior art motor wiring. Therefore, technicians or maintenance personnel can service and maintain the integral gearmotor and housing of this invention, but in considerably less time and with less effort than for prior art structure.

Not only does the integral gearmotor in field operations have more efficient and simpler maintenance and installation requirements than conventional coupled motor/gear drives, but manufacture of an integral gearmotor possesses great advantages over the prior art separate manufacture of motors and speed reducers for in-field coupling and installation. For example, the presently disclosed manufacturing technique and overall apparatus design can result in estimated cost savings of up to 30% over previously manufactured separate motors and speed reducers.

Generally speaking, stator assembly 13 of motor 12 and driven gear 24 with output shaft 25 may be essentially conventional parts, as well as the bearing assemblies and seals generally used in housing 10. Extended common shaft 14 is of novel construction and preferably includes driving gear 22 attached thereto or formed therein. Any known technique for the manufacture of a shaft having the physical characteristics set forth above in accordance with this invention may be used.

The following concerns a shim technique for one method of actual fabrication of the integral gearmotor, which technique assures precise air gap characteristics for the stator/rotor air gap of the motor, and precise concentricity thereof. Furthermore, this technique obviates the need for very precise (and hence expensive) machining of bearings and bores in a housing so as to otherwise provide such a high level of concentricity and air gap accuracy.

In essence, a housing 10 such as illustrated in FIG. 1 is provided with stator mounting means, such as stator locating pads 64 and 66. One large such "pad" could extend around the inner periphery of housing 10 or some part thereof. Alternatively, a plurality of pads could be positioned around the interior of the housing. At least one "pad" is necessary to perform the present method. It is preferred to have at least two stator pads disposed on roughly opposite sides of stator assembly 13. Stator assembly 13 is temporarily located within housing 10 such that outer portions thereof are relatively adjacent, though not necessarily touching, respective stator pads. Then, shaft 14 with rotor 15 attached thereto is rotatably supported within housing 10 at bearings 16, 18 and 20 with rotor 15 located within stator 13.

Shims (eg., 51 in phantom in FIG. 1) are positioned around rotor 15, between rotor 15 and stator assembly 13. Shims 51 may be virtually any suitable material, such as brass, approximately 0.006 to 0.012 inches thick. A single circular "tin can" type shim may be used, or a plurality of smaller shims may be inserted around rotor 15. It is preferred in one embodiment to use at least three shims spaced at 120° intervals and inserted completely along rotor assembly 15. Use of a higher (or lower) number of shims is, of course, also an included feature of this invention.

With stator 13 and rotor 15 held in a desired spatial relationship temporarily by shims (or shim) 51, stator assembly 13 may be secured to the appropriate stator placement pads 64 and 66. This may be accomplished with a wide variety of adhesive materials, but especially useful for the purpose are epoxy adhesives, and particularly those which are thermally-conducting and electrically-insulating. Such an epoxy adhesive has sufficient strength and bonding capabilities to bridge even relatively wide gaps. Hence, a wide degree of "play" is permitted for the initial placement of stator 13 into association with housing 10.

After the epoxy adhesive has sufficiently cured, shims 51 are then simply removed. The process of producing an integral gearmotor with housing assembly 10 proceeds with insertion of driven gear 24 into housing 10 so that it matingly contacts driving gear portion 22 of extended shaft 14. The interior chamber 28 may then be filled with lubricating oil as desired, and the two portions of housing 10 secured to one another. Hole 31 and plug 33 may be included in this filling process as desired, as discussed above.

Alternatively, the initial steps of the shim method may be modified so that a stator and rotor are first spatially related to each other as desired with shims. Then, such a combined stator/rotor/shim unit would be suitably mounted on a frame, with the remainder of the shim method proceeding as above.

Housing 10 need not be separated into approximate halves, but may be fractionally divided (such as 60/40 or 70/30) in any ratio as desired to facilitate ease of manufacture. As discussed above, housing 10 may be permanently sealed with brads, rivets or any welding technique (with the intention of preventing in-field tampering or the like), or may be re-sealably enclosed so that salvage operations of the contained motor and speed reducer parts may be undertaken.

The resulting integral gearmotor and housing of this invention possess numerous advantages over the prior art. Such advantages include low cost of manufacture and assembly due to its relatively simple construction. The number of required parts is reduced due to shaft 14 shared between motor 12 and gears 22, 24, as well as the unique coupling therebetween. Improved torque transfer and efficiency are achieved with use of common shaft 14 which is axial with the central axis of motor 12 and also is joined with driving gear portion 22 of a driving gear assembly.

The interaction of the integral motor and gear assembly with housing 10 permits universal mounting of housing 10 so that a wide variety of drive needs may be met. Output shaft 25 may be oriented in unlimited fashion (eg., up, down, sideways, angled, etc.) in a given environment so as to meet the particular drive needs of that environment. At the same time, housing 10, particularly due to the sealing function of interior chamber 28, prevents any spillage of lubricating oil which might otherwise be very detrimental to a given environment.

While a particular preferred embodiment and several modifications thereto have been discussed above in detail, all such description is intended as exemplary only of the present invention and is not intended to be limiting thereto. Many modifications and variations may occur to one of ordinary skill in the art while applying this invention to particular environments. For example, the oil sealing feature of interior chamber 28 may be sufficient for a particular application and housing 10 then need not be separately sealed, thereby resulting in savings of materials and/or increased heat dissipation characteristics. Or, the "shoebox-type" outward appearance of the housing could be modified to a rounded, eggshaped or the like shape as necessary to accomodate unusual physical aspects of particular applications. Further, the "housing" could be essentially omitted and use of the integral gearmotor practiced alone, simply formed around a support frame. Likewise, the shim air gap fabrication method is generally applicable to many different motor manufacturing situations. Also, motor 12 could be some other motive power apparatus (such as a hydraulic or gas powered system) instead of an electric motor. In such a case, the housing in accordance with this invention would be modified for appropriate hydraulic and/or gas lines to traverse the housing as the input power transmission means, in a manner analagous to the electrical wiring and chamber therefor of the presently illustrated embodiments. All such modifications and variations which would occur to one of ordinary skill in the art are included within the scope of the present invention, which is further defined only by the appended claims.

What is claimed is:

1. A method of assembling a motor so as to establish a uniform air gap between respective rotor and stator assemblies thereof, comprising in sequence the steps of:
   providing an integral support frame having a pair of axially-aligned shaft receiving members and at least one stator support member;
   temporarily supporting said stator assembly relative said frame;
   securely rotatably supporting a shaft, having said rotor assembly secured thereon, on said pair of frame shaft receiving members and within said stator;
   temporarily inserting shim means between said rotor and stator assemblies so as to define a predetermined air gap therebetween;
   securing said stator assembly to said support frame stator support member without changing the defined predetermined air gap; and
   removing said shim means, thereby providing a concentric rotor/stator assembly of desired predetermined air gap.

2. A method as in claim 1, wherein said securing step includes fixing said stator assembly to said stator support member with an adhesive material.

3. A method as in claim 1 wherein said inserting step includes inserting shim means comprising at least three separate shim elements, one each disposed at approximately 120° intervals around said rotor assembly, and each formed with a thickness of between 0.006 to 0.012 inches.

4. A method as in claim 1, wherein:
   said support frame comprises a sealable gearmotor housing, and said shaft receiving members comprise a pair of axial end bores defined in said housing, with a pair of rotatable bearing means respectively received in said bores.

5. A method as in claim 4, wherein said step of providing said support frame includes forming said housing bores by boring same in a single stroke, thereby ensuring precise and fixed axial alignment of such bores.

6. A method of assembling a motor, comprising in sequence the steps of:
   providing an integral frame having two relatively axially spaced bearing means supported thereon in substantial axial alignment;
   placing a stator assembly proximate said frame and generally between said pair of spaced bearing means;
   rotatably fixing to said frame a shaft supporting a rotor assembly thereon, so that axially spaced portions of said shaft are received respectively by said pair of bearing means, and so that said rotor assembly is situated within said stator assembly;

inserting separation means between said stator and rotor assemblies so as to form a predetermined air gap therebetween;

rigidly fixing said stator assembly to said frame without disturbing said predetermined air gap; and removing said separation means so as to permit rotation of said rotor assembly relative said stator assembly.

7. A method of assembling a gear system, motor and housing, including the steps of:

providing an integral housing having first and second respectively sealable chambers stator mounting means situated in said first chamber, and a pair of precision axially-aligned bores respectively formed in axial ends of said housing;

providing respective rotor and stator assemblies, and an extended shaft with said rotor assembly supported thereon and having respective bearing assemblies received in each of said housing bores;

associating said rotor and stator assemblies such that a predetermined air gap is formed between said rotor and stator assemblies by placement of shims therebetween, and said extended shaft projects at least partially through said first and second chambers and is rotatably journaled in said respective bearing assemblies;

fixedly securing said stator assembly to said stator mounting means, without disturbing said predetermined air gap and without dislodging said shaft from said bearing assemblies;

removing said shims from between said rotor and stator assemblies; and placing a gear system having first and second gears and an output shaft in said second chamber such that said extended shaft is in driving relation with said gear system.

8. A method as in claim 7, wherein said placing step includes forming said first gear in integral relation with said extended shaft, engaging said first gear so as to drive said second gear, and mounting said second gear on said output shaft such that said output shaft is driven through said engagement of said first and second gears when said extended shaft turns, and wherein said output shaft at least partially extends out from said second chamber.

9. A method as in claim 8, wherein said placing step further includes rotatably mounting said output shaft such that its axis of rotation is 90° different from that of said extended shaft.

10. A method of assembling an integral gearmotor and housing, including the steps of:

providing an integral support housing defining first and second chambers and including stator mounting means in said first chamber;

forming axially-aligned bores in respective ends of said housing;

situating bearing means in said bores;

temporarily associating a stator assembly for a motor with said stator mounting means;

rotatably mounting a first shaft within said housing, with at least some portion of said first shaft being disposed in both of said chambers, and with said first shaft having secured thereto a rotor assembly for said motor disposed in said first chamber, said first shaft being rotatably mounted about a fixed axis journaled in said bearing means;

disposing predetermined separation means in the air gap between said stator and rotor assemblies;

fixedly mounting said stator assembly on said stator mounting means;

withdrawing said predetermined separation means from said air gap;

attaching a first gear to another portion of said first shaft disposed in said second chamber; and providing a second shaft and a second gear fixedly mounted thereon, with said second gear being in operative engagement with said first gear.

11. A method as claimed in claim 10 wherein said second shaft is rotatably mounted within said second chamber during the second-recited providing step.

12. A method as claimed in claim 10, wherein said first and second gears collectively comprise a gear reducer mechanism having a reducing ratio within the range of from 5:1 to 60:1.

13. A method as in claim 10, wherein said bore forming step includes boring said pair of bores in said housing with a single stroke, thereby ensuring precise and fixed axial alignment of such bores.

14. A method as in claim 10, wherein said housing defines an opening between said two chambers for said first shaft to pass therethrough.

15. A method as in claim 14, wherein further bearing means are provided in said opening with said first shaft also journaled therein.

16. A method as in claim 10, wherein said two chambers enclose respectively said two assemblies and said two gears, and said second chamber has an amount of lubricating oil included therein, and wherein sealing means are disposed about said first shaft adjacent said opening so as to seal said lubricating oil in said second chamber.

* * * * *